Patented Apr. 18, 1933

1,904,603

UNITED STATES PATENT OFFICE

RAYMOND F. BACON, OF BRONXVILLE, AND ISAAC BENCOWITZ, OF NEW YORK, N. Y.; SAID BENCOWITZ ASSIGNOR TO SAID BACON

RECOVERY OF SULPHUR

No Drawing.    Application filed March 5, 1930. Serial No. 433,501.

This invention relates to the recovery of sulphur and has for an object the provision of an improved process for recovering sulphur from heavy metal sulphide ores. More particularly, the invention contemplates the provision of an improved process for recovering sulphur from materials containing one or more sulphides of iron. The invention further contemplates the provision of an improved process for treating heavy metal sulphide ores such, for example, as ore containing sulphides of iron, copper and nickel.

The process of the present invention involves the treatment of ore or other metallurgical raw materials or products containing pyrites or other sulphides of iron, alone or in combination with sulphides of other heavy metals such, for example, as copper and nickel, with hydrogen chloride for the purpose of obtaining free sulphur and/or separating iron from the mass of material undergoing treatment.

The present invention is based on our discovery that a reaction between pyrites and hydrogen chloride is promoted when conducted in the presence of certain agents, which are capable of reacting with sulphur to form one or more volatile sulphur compounds.

Hydrogen sulphide and sulphur dioxide may be produced by heating pyrites-bearing material in the presence of hydrogen chloride and a substance which is capable of providing oxygen for combining with sulphur to form sulphur dioxide. For example, hydrogen sulphide and sulphur dioxide may be produced by heating pyrites-bearing material in the presence of hydrogen chloride and air or carbon dioxide. When carbon dioxide is employed, carbonyl sulphide is produced in addition to the hydrogen sulphide and sulphur dioxide. Pyrites-bearing material may be heated in the presence of hydrogen chloride and carbon monoxide to produce hydrogen sulphide and carbonyl sulphide.

Mixtures containing hydrogen chloride and any desired number of agents such, for example, as oxygen, carbon dioxide and carbon monoxide, in any desired proportions may be utilized for producing mixtures of gases containing hydrogen sulphide, sulphur dioxide and carbonyl sulphide. Flue gases which ordinarily contain free oxygen, carbon monoxide, and carbon dioxide may be used advantageously. The sulphur content of smelter gases containing free oxygen, carbon monoxide, carbon dioxide and sulphur dioxide may be increased by employing such gases in conjunction with hydrogen chloride. Free oxygen may be provided by means of air.

When a mixture of air and hydrogen chloride is employed, the reactions involved will take place satisfactorily at temperatures as low as 400° C., but the reactions proceed more rapidly at higher temperatures. In such cases, temperatures between 400° C. and about 800° C. may be used advantageously. Ordinarily, a maximum temperature of about 600° C. is entirely satisfactory.

If a mixture of reagents comprising hydrogen chloride and an agent such, for example, as carbon dioxide or carbon monoxide is employed, it is desirable to maintain a temperature above 700° C.

A complete process of the invention involves the treatment of pyrites-bearing material under such conditions that a mixture of gases comprising hydrogen sulphide and carbonyl sulphide or hydrogen sulphide, carbonyl sulphide and sulphur dioxide is produced. The gases may be passed through water to hydrolyze the carbonyl sulphide contained therein and produce an additional quantity of hydrogen sulphide in accordance with the following equation:

I.  $COS + H_2O = H_2S + CO_2$ or they may be heated in the presence of oxygen to produce sulphur dioxide in accordance with the following equation:

II.  $2COS + 3O_2 = 2SO_2 + 2CO_2$

If the gases are heated in the presence of oxygen the hydrogen sulphide contained therein will also be burned to produce sulphur dioxide. The sulphur compounds of the gases may be utilized for any desired purpose.

We prefer to treat the sulphur compounds of the gases to recover elemental sulphur. This may be done, conveniently, by so conducting the operations as to produce hydrogen sulphide and sulphur dioxide in proper proportions for carrying out a reaction in accordance with the following equation:

III.  $2H_2S + SO_2 = 2H_2O + 3S$ or by so conducting the treatment of the pyrites-bearing material as to produce an excess of hydrogen sulphide and combining the hydrogen sulphide produced with sulphur dioxide from another source in the required proportions for carrying out the aforementioned reaction.

The relative amounts of sulphur dioxide and hydrogen sulphide produced may be controlled by regulating the amounts of reagents employed. The process may be so controlled that two molecules of hydrogen sulphide are produced for every molecule of sulphur dioxide produced, or it may be so controlled that any desired relative amounts of the two compounds may be produced and any additional amount of either compound which may be required may be supplied from a separate source.

According to the preferred process of the invention, two or more separate operations for the production of mixtures of sulphur dioxide and hydrogen sulphide are conducted simultaneously, and the resulting gases are combined for the purpose of the operation for producing elemental sulphur. It is difficult to so control a single operation as to produce the theoretical amounts of sulphur dioxide and hydrogen sulphide required for carrying out the reaction for the production of elemental sulphur, but an operation may be readily adjusted to produce mixtures of gases containing fixed proportions of hydrogen sulphide and sulphur dioxide with either in excess. We, therefore, prefer to conduct two or more separate operations to produce different mixtures of gases containing hydrogen sulphide and sulphur dioxide in different proportions but all of which may be combined to produce a mixture containing hydrogen sulphide and sulphur dioxide in proper proportions. This procedure permits all of the operations to be conducted continuously without frequent adjustments, or, if the combined gases show a tendency to vary, one of the operations may be utilized for control purposes. Since the carbonyl sulphide produced may be readily converted to either hydrogen sulphide or sulphur dioxide it provides a convenient means for adjusting the composition of the mixture of gases.

The invention will be better understood from a consideration of the following description of a process for treating ore containing pyrites and sulphides of copper and nickel with a mixture of reagents comprising hydrogen chloride and flue gas containing oxygen, carbon dioxide, carbon monoxide and sulphur dioxide.

The ore to be treated is introduced in a finely divided condition into the interior of two similar rotary reaction chambers each having ore charging means at one end and discharging means at the other end, and which are so constructed and operated that the ore is gradually moved from the charging ends toward the discharge ends. Hydrogen chloride and flue gases are introduced into the reaction chambers at the ends opposite to those at which the ore is introduced and the ore and hydrogen chloride and flue gases pass through the reaction chambers in counter-current relationship, the volatile sulphur compounds produced being removed from the reaction chambers at points near the charging ends.

The ore is preferably ground to provide particles sufficiently small to pass a 100-mesh screen in order that intimate contact of the sulphide particles with the flue gases and hydrogen chloride may be obtained. The presence of a small amount of water in the ore will not produce harmful results.

The reactions involved proceed satisfactorily at a temperature of about 400° C. to 500° C. but they proceed more rapidly and more completely at a temperature of about 700° C. It is, therefore, advisable to maintain a temperature of about 700° C. in at least a portion of each reaction chamber. Such a temperature may be maintained in the charging end portions of the reaction chambers to insure the passage of all issuing gases through zones in which conditions are conducive to a complete reaction.

The process is preferably so controlled that a temperature of about 700° C. is maintained near the charging ends of the reaction chambers and a temperature of about 300° C. to 400° C. is maintained near the discharge end portions of the reaction chambers.

The hydrogen chloride and flue gas are introduced into portions of the reaction chambers which are maintained at a temperature of about 300° C. to 400° C. The hydrogen chloride, components of the flue gases and metal sulphides react to produce carbonyl sulphide, sulphur dioxide, hydrogen sulphide, ferrous chloride and the chlorides of copper and nickel. Some heavy metal oxides are also produced. The chlorides and oxides produced and the gangue materials of the original ore are discharged continuously in the form of a solid residue. Small amounts of hydrogen sulphide and sulphur dioxide react within the reaction chambers to produce elemental sulphur which is vaporized. The gases issuing from the reaction chambers are mixtures comprising carbonyl sulphide, hydrogen sulphide, sulphur dioxide, sulphur vapor, nitrogen and small amounts of hydrogen chloride.

One of the reaction chambers is preferably operated under constant conditions with respect to temperature and amounts of ore and reagents introduced. The other reaction chamber is preferably utilized for control purposes and operated under variable controlled conditions. The variable operation is so conducted that the gases from the two chambers may be combined to provide hydrogen sulphide and sulphur dioxide in proper proportions for carrying out a reaction for producing elemental sulphur. Air is preferably admitted to the control chamber for the purpose of controlling the amount of sulphur dioxide produced.

The gases produced are combined and the resulting mixture is cooled to condense the sulphur vapor contained therein. The remaining gases are passed in contact with water. The hydrogen chloride contained in the gases is dissolved in the water to form a dilute solution of hydrochloric acid which promotes a reaction between hydrogen sulphide and sulphur dioxide and aids in precipitating the elemental sulphur produced. The carbonyl sulphide is hydrolyzed to produce hydrogen sulphide. The operations are preferably so conducted as to produce an amount of sulphur dioxide which in addition to that contained in the flue gases will be sufficient to react with all of the hydrogen sulphide resulting from the treatment of the pyrites-bearing material and the hydrolysis of the carbonyl sulphide. The elemental sulphur produced may be separated from the hydrochloric acid solution in any suitable manner as, for example, by settling and decantation or by filtering.

The hot residue containing the heavy metal chlorides and oxides may be treated in any desired manner to regenerate hydrogen chloride and/or to recover the metal values.

We claim:

1. In a process for treating pyrites-bearing material to recover sulphur, the improvement which comprises subjecting the pyrites-bearing material to the action of hydrogen chloride in the presence of an agent of the group air, oxygen, carbon dioxide, carbon monoxide, flue gases and the like which reacts with sulphur to form a volatile sulphur compound.

2. In a process for treating pyrites-bearing material to recover sulphur, the improvement which comprises subjecting the pyrites-bearing material to the action of hydrogen chloride in the presence of an oxygen-containing gas which reacts with sulphur to produce sulphur dioxide.

3. In a process for treating pyrites-bearing material to recover sulphur, the improvement which comprises subjecting the pyrites-bearing material to the action of hydrogen chloride in the presence of one or more oxides of carbon.

4. In a process for treating pyrites-bearing material to recover sulphur, the improvement which comprises heating the pyrites-bearing material in the presence of hydrogen chloride and an agent of the group air, oxygen, carbon dioxide, carbon monoxide, flue gases and the like which reacts with sulphur to form a volatile sulphur compound.

5. In a process for treating pyrites-bearing material to recover sulphur, the improvement which comprises heating the pyrites-bearing material in the presence of hydrogen chloride and an oxygen containing gas which reacts with sulphur to produce sulphur dioxide.

6. In a process for treating pyrites-bearing material to recover sulphur, the improvement which comprises heating the pyrites-bearing material in the presence of hydrogen chloride and one or more oxides of carbon.

7. In a process for treating pyrites-bearing material to recover sulphur, the improvement which comprises heating the pyrites-bearing material in the presence of hydrogen chloride, oxygen and one or more oxides of carbon.

8. In a process for treating pyrites-bearing material to recover sulphur, the improvement which comprises heating the pyrites-bearing material in the presence of hydrogen chloride and a flue gas comprising oxygen and one or more oxides of carbon.

9. In a process for treating pyrites-bearing material to recover sulphur, the improvement which comprises heating the pyrites-bearing material in the presence of hydrogen chloride and a flue gas comprising oxygen, one or more oxides of carbon and sulphur dioxide.

10. In a process for treating pyrites-bearing material, the improvement which comprises heating the pyrites-bearing material to a temperature of about 700° C. in the presence of hydrogen chloride and one or more oxides of carbon.

11. The method of recovering sulphur from pyrites-bearing material which comprises subjecting the material at an elevated temperature to the action of hydrogen chloride, an agent of the group air, oxygen, carbon dioxide, carbon monoxide, flue gases and the like which reacts with sulphur to form a volatile sulphur compound, and treating the volatile sulphur compound to recover elemental sulphur.

12. The method of recovering sulphur from pyrites-bearing material which comprises subjecting the material at an elevated temperature to the action of hydrogen chloride and one or more oxides of carbon to produce hydrogen sulphide and carbonyl sulphide, and treating the hydrogen sulphide and carbonyl sulphide produced to recover elemental sulphur.

13. The method of recovering sulphur from pyrites-bearing material which comprises subjecting the material at an elevated temperature to the action of hydrogen chloride, air and one or more oxides of carbon to produce hydrogen sulphide, carbonyl sulphide and sulphur dioxide, and reacting the sulphide compounds with sulphur dioxide to recover elemental sulphur.

14. The method of recovering sulphur from pyrites-bearing material which comprises subjecting the material at an elevated temperature to the action of hydrogen chloride, air and one or more oxides of carbon to produce hydrogen sulphide, carbonyl sulphide and sulphur dioxide, and passing the sulphur compounds thus produced in contact with water to hydrolyze the carbonyl sulphide and cause a reaction between sulphur dioxide and hydrogen sulphide to produce elemental sulphur.

In testimony whereof we affix our signatures.

RAYMOND F. BACON.
ISAAC BENCOWITZ.